US009589403B2

United States Patent
Lingan et al.

(10) Patent No.: US 9,589,403 B2
(45) Date of Patent: Mar. 7, 2017

(54) ACCESS CONTROL VIA A MOBILE DEVICE

(71) Applicant: Honeywell International Inc., Morristown, NJ (US)

(72) Inventors: Magesh Lingan, Bangalore (IN); Rajkumar Palanivel, Bangalore (IN); Murugan Gopalan, Bangalore (IN); Mandar Tigga, Bangalore (IN); Vivek Kalyan, Bangalore (IN); Sanjay Roy, Plymouth, MN (US); Frank Lin, Oatlands (AU); Bryan Jones, Muswellbrook (AU); Datta Godbole, Plymouth, MN (US); Himanshu Khurana, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/919,304

(22) Filed: Oct. 21, 2015

(65) Prior Publication Data
US 2016/0335819 A1  Nov. 17, 2016

Related U.S. Application Data

(63) Continuation-in-part of application No. 14/713,767, filed on May 15, 2015.

(51) Int. Cl.
G05B 19/00 (2006.01)
G07C 9/00 (2006.01)
(Continued)

(52) U.S. Cl.
CPC ..... *G07C 9/00111* (2013.01); *H04M 1/72572* (2013.01); *H04W 4/021* (2013.01); *H04W 4/023* (2013.01); *H04W 4/026* (2013.01)

(58) Field of Classification Search
CPC .............. G06Q 20/204; G06Q 20/327; G06Q 20/3674; G06Q 20/425
(Continued)

(56) References Cited

U.S. PATENT DOCUMENTS 8,232,879 B2  7/2012  Davis
8,427,320 B2  4/2013  Davis
(Continued)

FOREIGN PATENT DOCUMENTS

CN  104200555 A  12/2014
WO  2014031399  2/2014

OTHER PUBLICATIONS

Usher Mobile Identity Platform. MicroStrategy. 24 pages. https://www.microstrategy.com/Strategy/media/downloads/products/usher_overview-presentation.pdfpresentation.pdf. Accessed Feb. 5, 2015.
(Continued)

*Primary Examiner* — Ojiako Nwugo
(74) *Attorney, Agent, or Firm* — Brooks, Cameron & Huebsch, PLLC

(57) ABSTRACT

Systems, devices, and methods for access control via a mobile device are described herein. One device includes instructions stored thereon executable by a processor to receive location information associated with a mobile device in a facility, determine that the mobile device is within a particular distance of an area of the facility based on the location information, receive an indication of a user input by the mobile device, determine whether a user of the mobile device is allowed access to the area, and allow access to the area via a relay associated with the area responsive to a determination that the user is allowed access and the user input.

20 Claims, 2 Drawing Sheets

(51) Int. Cl.
*H04W 4/02* (2009.01)
*H04M 1/725* (2006.01)

(58) Field of Classification Search
USPC .................................... 340/5.51, 5.52, 5.53
See application file for complete search history.

(56) References Cited

U.S. PATENT DOCUMENTS

| | | |
|---|---|---|
| 8,643,475 B1 | 2/2014 | Kohno et al. |
| 8,768,306 B1 | 7/2014 | Ben Ayed |
| 2004/0192268 A1* | 9/2004 | Pyhalammi ............. G06F 21/43 455/414.1 |
| 2008/0094171 A1* | 4/2008 | Sawhney ........... G07C 9/00103 340/5.6 |
| 2008/0183313 A1* | 7/2008 | Lundquist ............. G06F 1/1616 700/84 |
| 2010/0052931 A1 | 3/2010 | Kolpasky et al. |
| 2011/0165859 A1* | 7/2011 | Wengrovitz ........ H04M 1/7253 455/411 |
| 2013/0155237 A1* | 6/2013 | Paek ..................... G06F 1/1632 348/148 |
| 2013/0176107 A1 | 7/2013 | Dumas et al. |
| 2014/0049361 A1* | 2/2014 | Ahearn ............. G07C 9/00309 340/5.7 |
| 2014/0229385 A1* | 8/2014 | Neafsey ............. G06Q 20/3674 705/67 |
| 2014/0240087 A1 | 8/2014 | Liu et al. |
| 2014/0255036 A1* | 9/2014 | Jovicic ................. H04B 10/116 398/115 |
| 2014/0267739 A1 | 9/2014 | Ibsies |
| 2014/0375421 A1 | 12/2014 | Morrison et al. |
| 2016/0110530 A1* | 4/2016 | Chalmers ................ G06F 21/32 726/4 |

OTHER PUBLICATIONS

Woollaston, "The end of the house key? Mobile app lets you open your front door using your Phone (and you don't even need to take it out of your pocket)", http://www.dailymail.co.uk/sciencetech/article-2384817/Kwikset-Kevo-mobile-app-lets-open-door-using-PHONE.html., Aug. 5, 2013, 3 pp.
"Sesame Smart Lock", http://www.candyhouse.co/. 8pp, Accessed Oct. 21, 2015.

* cited by examiner

ACCESS CONTROL VIA A MOBILE DEVICE

CROSS REFERENCE TO RELATED APPLICATION

This application is a continuation-in-part of U.S. application Ser. No. 14/713,767, filed May 15, 2015, the entire specification of which is incorporated herein by reference.

TECHNICAL FIELD

The present disclosure relates to systems, devices, and methods for access control via a mobile device.

BACKGROUND

Access control systems are designed to provide access to areas of a building for individuals who are authorized to access such areas, and deny access to those areas of the building to individuals who are not authorized to access such areas. For example, certain individuals may be authorized to access a secure area of a building, whereas other individuals may not be allowed to access the secure area.

Previous approaches to access control systems may utilize costly hardware devices located at perimeter(s) of secure areas to verify a user's identity. In some examples, personal identification number (PIN) pads, biometric sensors (e.g., fingerprint sensors and/or physical access cards (e.g., badges) may be used.

Carrying a physical access card may be cumbersome. A user may be locked out of an area if the user forgets to carry the physical access card, and an unauthorized user may gain access to a secure area because the access control system cannot verify the physical identity of the user carrying the physical access card. In addition, such hardware devices may not only be expensive to install, operate, and/or maintain, but may soon become obsolete.

DETAILED DESCRIPTION

Figure 1:
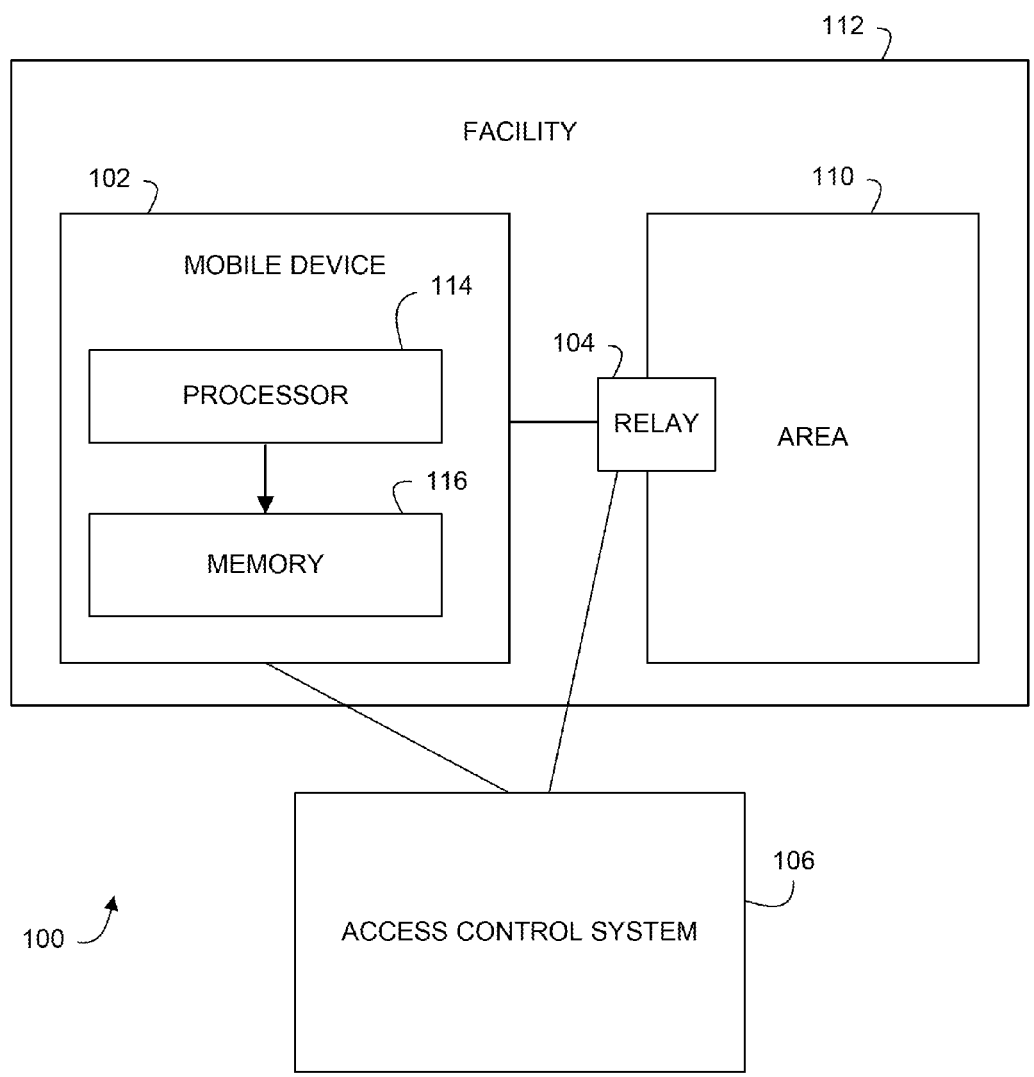
FIG. 1 illustrates a system for access control via a mobile device in accordance with one or more embodiments of the present disclosure.

Access control via a mobile device is described herein. For example, one or more embodiments include a computer-readable medium having instructions stored thereon executable by a processor to receive location information associated with a mobile device in a facility, determine that the mobile device is within a particular distance of an area of the facility based on the location information, receive an indication of a user input by the mobile device, determine whether a user of the mobile device is allowed access to the area, and allow access to the area via a relay associated with the area responsive to a determination that the user is allowed access and the user input.

Embodiments of the present disclosure can effectively replace a user-carried physical access card and access control system hardware devices with a mobile device. By using a mobile device—something most users typically already carry—embodiments of the present disclosure can provide increased security while streamlining user interaction with the access controls system. Additionally, embodiments herein can reduce costs by obviating the need for expensive hardware devices to verify user identities.

Increased security can be provided through capabilities offered by mobile devices. In some embodiments, biometric validation (e.g., fingerprint scanning) can be carried out via the mobile device. In some embodiments, users (i.e., the user's mobile device) can be assigned a digital identity (discussed further below). The digital identity can allow the mobile device, instead of a physical hardware access controller, to control access, for instance.

User interaction with the access control system can be streamlined via capabilities offered by mobile devices. In some embodiments, global positioning system (GPS), WiFi, and/or other location functionalities provided by the mobile device may allow the automatic determination of user location (e.g., without user input). Thus, rather than physically presenting a card (or other device) for access to an area, the user can simply draw within a particular distance of the area.

That is, whereas previous approaches may utilize "card readers," which typically call for a user to present a card (e.g., badge and/or other token), read the card, then transmit a signal physically to an access controller to make an access determination (e.g., whether the user is allowed access), embodiments of the present disclosure can allow the mobile device itself to effectively become the card. Then, the "card" can be presented to a "reader" by virtue of the mobile device being in a particular physical location (or within a particular distance of a particular physical location).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. As used herein, "a" or "a number of" something can refer to one or more such things. For example, "a number of areas" can refer to one or more areas.

FIG. 1 illustrates a system 100 for access control via a mobile device in accordance with one or more embodiments of the present disclosure. As shown in FIG. 1, system 100 includes a mobile device 102, a relay 104, and an access control system (ACS) 106. One or more portions of the system 100 can be implemented in a facility 112, for instance. A facility, as used herein, can refer to one or more buildings, businesses, homes, plants, hospitals, refineries, etc. Facilities can include indoor and/or outdoor areas. Though in the example illustrated in FIG. 1 the ACS 106 is shown external to the facility 112 (e.g., remote with respect to the facility 112), embodiments of the present disclosure are not so limited. In some embodiments, the ACS 106 is internal to the facility 112 (e.g., local with respect to the facility 112).

The mobile device 102 can be a client device carried or worn by a user. For example, the mobile device 102 can be a phone (e.g., smartphone), personal digital assistant (PDA), tablet, and/or wearable device (e.g., wristband, watch, necklace, etc.). The mobile device 102 can include one or more software applications (e.g., apps) which can define and/or control communications between the mobile device 102, the ACS 106, and/or other devices. Apps may be received by the mobile device 102 from the ACS 106, for instance. Apps may be launched by a user and/or responsive to some other condition (e.g., the interaction between the mobile device 102 and a beacon (discussed below)). In some embodiments, apps can be executing as background apps. Apps may be and/or include a digital identity, discussed further below.

The relay 104 can be a device allowing remote control that can be actuated by variation in conditions of one or more electric circuits. In some examples, the relay 104 can be a locking device (e.g., for a door). In some examples, the relay 104 can include one or more actuating mechanisms. The relay 104 can be associated with one or more controlled functionalities. As used herein "controlled functionality" refers to a functionality under the control of the ACS 106. For instance, an electronic door lock may be controlled by the ACS 106.

In some embodiments, the control may be provided from the mobile device 102. In some embodiments, the control may be provided directly (from the ACS 106 to the relay 104) or via one or more intermediary devices (e.g., a controller) in communication with the relay 104.

Because, as described above, the "card" can be presented to a "reader" by virtue of the mobile device 102 being in a particular physical location (or within a particular distance of a particular physical location), embodiments of the present disclosure can implement the relay 104 in the absence of a controller (e.g., a local controller). That is, in some embodiments, the relay 104 does not include a controller. Various examples herein may refer to the relay 104 being a locking device for a door, but it is to be understood that such examples are not to be taken in a limiting sense; embodiments of the present disclosure do not limit relay 104 to a particular device.

The relay 104 can be associated with an area 110 of the facility 112. As referred to herein, an area can be a portion of a facility. In some embodiments, the area 110 can be a room, a plurality of rooms, a wing, a building, a plurality of buildings, an installation, etc. In some embodiments, the area 110 can be defined by physical boundaries (e.g., walls, doors, etc.). In some embodiments, the area 110 can be defined by logical and/or geographic boundaries. The area 110 can be defined by a user, by a Building Information Model (BIM) associated with the facility 112, and/or by the ACS 106.

The ACS 106 can control (e.g., manage) access to a number of areas (e.g., the area 110) of the facility 112. As previously discussed, the ACS 106 can be remote with respect to the facility 112 and/or local with respect to the facility 112. In some embodiments, the ACS 106 can be cloud-based. In some embodiments, the ACS 106 can manage access to one or more areas across a plurality of facilities.

The mobile device 102 can communicate with (e.g., exchange data with) the ACS 106 via a wired and/or wireless connection, for instance. In some embodiments, the mobile device 102 can communicate using one or more communications modules (e.g., cellular, WiFi, etc.). The ACS 106 can communicate with the relay 104 via a wired and/or wireless connection, for instance. Communication between various devices herein can be carried out over a wireless network. A wireless network, as used herein, can include WiFi, Bluetooth, or any other suitable means to wirelessly transmit and/or receive information.

The mobile device 102 can include a location functionality configured to determine a location of the mobile device. In some embodiments, the location functionality includes a GPS and/or WiFi functionality of the mobile device, though embodiments of the present disclosure are not so limited. For example, the mobile device can include an imaging functionality (e.g., a camera) which can be used to read a code at a particular (e.g., known) location in the facility 112.

In some embodiments, the system 100 can include a beacon. The beacon can be a device capable of wireless communication with the mobile device 102. In some embodiments, the beacon can be associated with (e.g., located proximal to) the relay 104 and/or the area 110. In addition to, or in place of, the location functionality of the mobile device 102, the beacon can allow the determination of a location of the mobile device 102. For example, the beacon can allow the determination of whether the mobile device 102 is within a particular (e.g., threshold) distance of the area 110, the relay 104, and/or the beacon. The beacon can communicate with the mobile device 102 via Bluetooth Low Energy (BLE) technology (e.g., as an iBeacon), WiFi, etc. In some embodiments, the beacon can include one or more readable tags (e.g., near field communication (NFC)) tags.

The mobile device 102 can include a memory 116 and a processor 114 configured to execute executable instructions stored in the memory 116 to perform various examples of the present disclosure, for example. That is, the memory 116 can be any type of non-transitory storage medium that can be accessed by the processor 114 to perform various examples of the present disclosure. For example, the memory 116 can be a non-transitory computer readable medium having computer readable instructions (e.g., computer program instructions) stored thereon that are executable by the processor 114.

The memory 116 can be volatile or nonvolatile memory. The memory 116 can also be removable (e.g., portable) memory, or non-removable (e.g., internal) memory. For example, the memory 116 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 116 is illustrated as being located within the mobile device 102, embodiments of the present disclosure are not so limited. For example, memory 116 can also be located internal to another computing resource (e.g., enabling computer readable instructions to be downloaded over the Internet or another wired or wireless connection). In some embodiments, the memory 116 and/or the processor 114 can be located in the ACS 106.

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Figure 2:
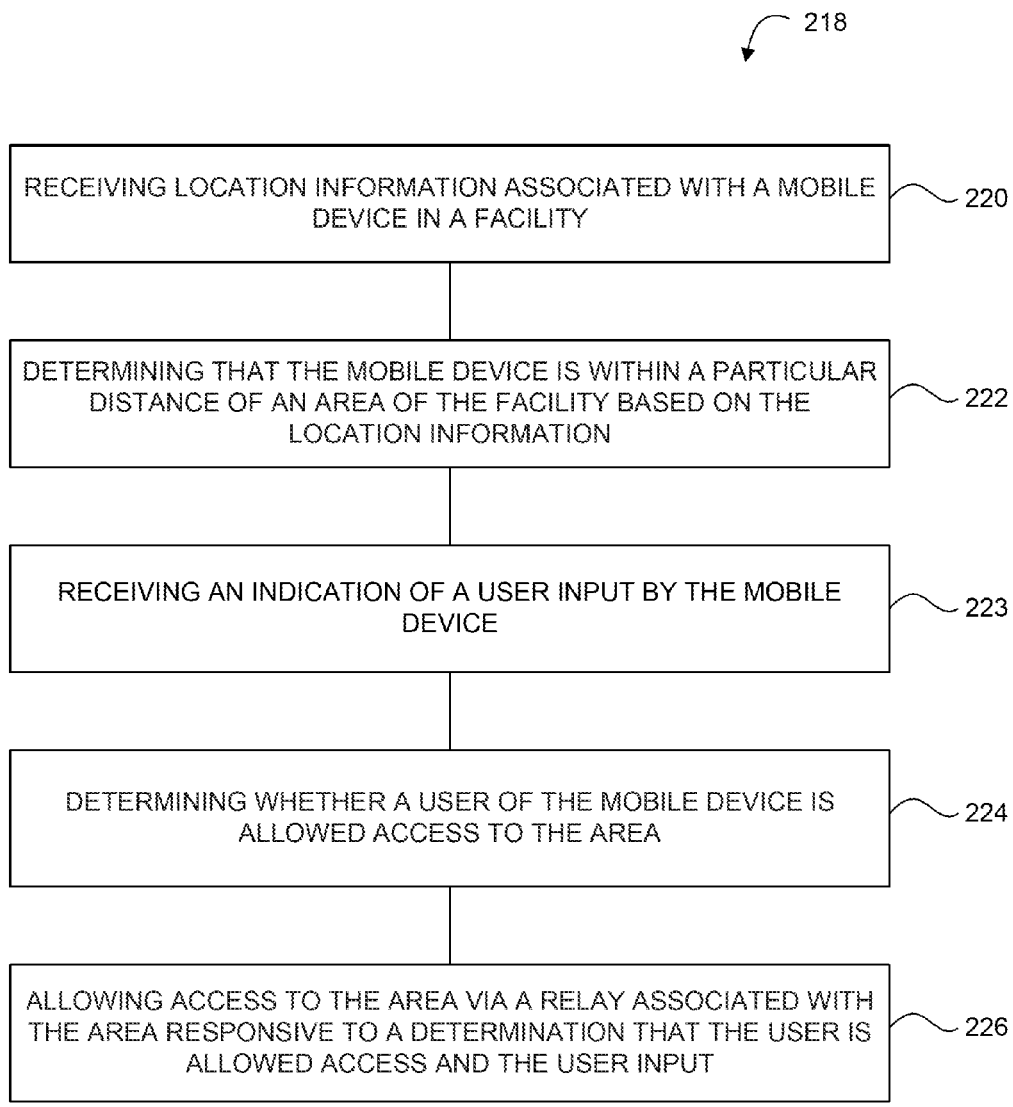
FIG. 2 illustrates a method for access control via a mobile device in accordance with one or more embodiments of the present disclosure.

FIG. 2 illustrates a method 218 for access control via a mobile device in accordance with one or more embodiments of the present disclosure. In some embodiments, method 218 can be performed by the mobile device 102 (previously discussed in connection with FIG. 1). In some embodiments, method 218 can be performed by ACS 106 (previously discussed in connection with FIG. 1), though embodiments of the present disclosure are not so limited.

At block 220, method 218 includes receiving location information associated with a mobile device in a facility. Location information can include a location of the mobile device. The location can be provided as a particular geographic location (e.g., latitude/longitude) and/or a location with respect to another location, such as an area of a facility or a beacon of a facility. In some embodiments, location information can be communicated from the mobile device, and thus received, responsive to a communication being established between the mobile device and one or more beacons of a facility. In some embodiments, an indication that the mobile device is within a particular distance of an area of a facility can be received (e.g., as a request for access to the area).

At block 222, method 218 includes determining that the mobile device is within a particular distance of (e.g., in proximity to) an area of the facility based on the location information. In some embodiments, location information can include a determination that the mobile device is located within a particular area and/or within a particular distance of an area of a facility. For example, embodiments of the present disclosure can determine that the user has drawn within 5 meters of a secure area of a facility. Being within the particular distance of the area may indicate that the user desires to enter the area. Further, embodiments of the present disclosure can determine a direction of travel of the user and/or a speed of the user. If the user is traveling directly toward the area, embodiments can determine that the user desires to enter the area.

At block 223, method 218 includes receiving an indication of a user input by the mobile device. In accordance with one or more embodiments of the present disclosure, mobile devices can receive an input (or a plurality of inputs) from a user requesting access. In some embodiments, access or access denial may depend on the performance of one or more particular inputs. The performance of such inputs may take place at a particular time and/or at a particular location.

In some embodiments, the user input is a gesture made using the mobile device. A gesture, as referred to herein, includes a particular movement, positioning, orientation, and/or manipulation of the mobile device. For example, in some embodiments, the gesture can include a knock by the user on the mobile device. In some embodiments, the gesture can include a plurality of knocks by the user on the mobile device. A "knock" can refer to a striking, by an object, of the mobile device. A knock on the mobile device can resemble a knock on a door, for instance.

In some embodiments, the gesture can include a manipulation of an orientation of the mobile device. For example, the mobile device can be shaken, rotated, and/or twisted, among other manipulations. In some embodiments, the gesture can include a presentation of the mobile device to an object associated with the area. That is, the mobile device can be presented (e.g., drawn near) a door, door reader, turnstile, door frame, etc. The mobile device can be knocked against a card reader, for instance.

In some embodiments, the gesture can include a particular manipulation of the mobile device, wherein the particular manipulation does not include the mobile device impacting an object. For example, the mobile device can be used to "knock" without making contact with another object (other than the user).

In some embodiments, the mobile device can be configured to prompt the user to make the gesture. For example, upon determining that the mobile device is within the particular distance of the area of the facility, embodiments of the present disclosure can prompt the user to make the gesture. The prompt can be a particular sound played by the mobile device and/or a particular vibration, among other prompts. In some embodiments, performance of the gesture before the prompt to make the gesture may be ineffective at obtaining access.

At block 224, method 218 includes determining whether a user of the mobile device (e.g., when the mobile device is in proximity to the area) is allowed access to the area. In some embodiments, the determination of whether the user of the mobile device is allowed access to the area can be made by the mobile device. In some embodiments, the determination of whether the user is allowed access to the area can be made by a (local and/or remote) access control system.

As discussed herein, the determination of whether the user of the mobile device is allowed access to the area can be made by the mobile device. Accordingly, access control (i.e., the determination of whether to grant access) can be moved from a controller (or other hardware device(s) seen in previous approaches) to the mobile device itself. Accordingly, where access control is implemented on a mobile device in accordance with embodiments of the present disclosure, facilities need not employ complex physical access controllers capable of managing access only to a limited number of access points (e.g., doors) as in previous approaches. Instead, a remote and/or virtual (e.g., cloud-based) controller can be implemented, for instance, in conjunction with one or more relays (such as those previously discussed).

Determining whether the user is allowed access to the area can include determining whether the user (via the mobile device) has been provided with (or otherwise received) a digital identity. A digital identity can correspond to the physical identity of the user. The digital identity can be unique to the mobile device of the user (e.g., one digital identity per mobile device of the user). The digital identity can be (or be a portion of) an app, for instance (e.g., executable instructions stored on a computer-readable medium).

In some embodiments, the digital identity can be a permanent digital identity. A permanent digital identity can be a digital identity that does not expire. For example, a permanent digital identity can be sent to the mobile device of a user who is an employee that works in the facility. The employee can utilize the permanent digital identity until the employee is no longer employed at the facility.

In some embodiments, the digital identity can be a temporary digital identity. A temporary digital identity can be a digital identity that expires after a set period of time. For example, a temporary digital identity can be sent to the mobile device of a user who is a visitor or guest at the facility. After the set period of time, the visitor/guest's temporary digital identity can expire, and the visitor/guest can lose access to the building (or to particular areas of the building). In some embodiments, the digital identity can be shared with a building management system. The building management system can allow management (e.g., monitoring and/or control) of the facility.

Thus, determining whether the user of the mobile device is allowed access to the area can include determining whether the user is allowed access at the particular time that the user is in proximity to the area. The time can refer to the time of a day and/or the day of a week, for instance, though embodiments of the present disclosure are not so limited.

A digital identity can be associated with (e.g., assigned) access rights. Access rights assigned to a digital identity can vary from one user to another. Access rights, as used herein, can include information describing a user's ability to access different areas of a facility. For example, a supervisory employee may be able to access more areas of a facility than a lower level employee.

In some embodiments, the access rights can be preconfigured access rights. For example, lower level employees can be given an access level that grants an employee access to lower security areas of a facility, whereas higher level employees can be given an access level that allows those higher level employees access to areas with higher security restrictions. As an additional example, access levels can be preconfigured based on the position the employee holds (e.g., a secretary can receive a different access level than a building technician).

In some embodiments, the access rights can be customized access rights. Customized access rights can include access rights that are customized for an individual user. For example, a user can receive access to areas A, B, C, and E, but not area D. As another example, a user can receive access to a number of areas of a building that do not fall within a preconfigured access level.

In some embodiments, a digital identity may expire after a particular period of time (e.g., one day). In some embodiments, a digital identity may expire based on a location of the mobile device. For example, a digital identity may expire when a user visiting the facility exits the facility. As the digital identity expires, so too can the access rights associated with it.

Some embodiments calling for enhanced security can verify that the mobile device to which the digital identity has been provided is indeed possessed by the correct user (e.g., the user allowed access). For example, the user can be authenticated to the mobile device. Such authentication can be carried out responsive to a prompt issued by the mobile device. In some embodiments, authenticating the user to the mobile device can include receiving one or more inputs made by the user. In some embodiments, input(s) can include PINs, codes, patterns, etc. In some embodiments, inputs can include one or more biometric inputs. A biometric input can include a fingerprint scan, a facial scan, etc., though it is to be understood that embodiments of the present disclosure are not limited to particular biometric input(s).

In some embodiments, determining whether the user of the mobile device (e.g., when the mobile device is in proximity to the area) is allowed access to the area can include determining whether a number of additional access rules apply. In some embodiments, a "two man rule" may apply wherein a user may not be allowed access unless that user is accompanied by another authorized user. That is, the presence of at least two authorized users within the particular distance of the area may be required in order to allow access.

In some embodiments, determining whether the user is allowed access to the area can include determining an occupancy status of the area. For example, certain areas may be limited with respect to a minimum or a maximum number of users allowed therein. In some embodiments, if a maximum allowed occupancy of an area has been reached, the user may be denied access. A notification regarding the reason for the denial may be provided via the mobile device.

In some embodiments, determining whether the user is allowed access to the area can include determining whether a particular user (e.g., an escort) is required to accompany the user into the area. For example, some areas may allow access by certain users (e.g., guests) only if those users are accompanied by another user (e.g., an employee).

At block 226, method 218 includes allowing access to the area via a relay associated with the area responsive to a determination that the user is allowed access and the user input. If the user is determined to be allowed access to the area, and if a proper input was made by the user into the mobile device (e.g., an acceptable gesture was made), the mobile device and/or the access control system can transmit a signal (e.g., a control signal) to a relay associated with the area to allow access. In an example, the relay can be responsible for physically locking a door to the area and the signal causes the relay to change from a locked mode to an unlocked mode. Thus, the relay can grant the user access to the area of the facility responsive to a determination by the mobile device and/or the access control system that the user is allowed access.

Although not illustrated in FIG. 2, method 218 can include providing a number of notifications via the mobile device. A notification can be provided, for instance, responsive to access being granted to the user. In some embodiments, the mobile device can emit a particular audio notification (e.g., a beep) when access is granted. In some embodiments, the mobile device can vibrate when access is granted.

A notification can be provided, for instance, responsive to access being denied to the user. In some embodiments, the mobile device can emit a particular audio notification (e.g., a buzzer) when access is denied. In some embodiments, the mobile device can vibrate when access is denied. In some embodiments, the notification can include an audio and/or textual message including an explanation and/or reason for the denial of access.

The notification of the denial can include an option to contact a security operator (e.g., guard) and/or maintenance personnel. Thus, if equipment failure is responsible for the denial it can be addressed in a timely manner. In some embodiments, a notification can be sent to a security operator responsive to a repeated denial and/or a denial to a particular (e.g., highly-secure) area without the user's knowledge.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions stored thereon executable by a processor to:
   receive location information associated with a mobile device in a facility;
   determine that the mobile device is within a particular distance of an area of the facility based on the location information;
   receive an indication of a user input by the mobile device, wherein a performance of the input is determined using the mobile device;
   determine whether a user of the mobile device is allowed access to the area; and
   allow access to the area via a relay associated with the area responsive to a determination that the user is allowed access and the user input.

2. The computer-readable medium of claim 1, wherein the instructions include instructions to receive the location information responsive to a communication being established between the mobile device and a beacon of the facility.

3. The computer-readable medium of claim 1, wherein the instructions to determine whether a user of the mobile device is allowed access to the area include instructions to determine whether the mobile device has been provided with a digital identity.

4. The computer-readable medium of claim 1, wherein the user input is a gesture made using the mobile device.

5. The computer-readable medium of claim 4, wherein the gesture includes a knock by the user on the mobile device.

6. The computer-readable medium of claim 4, wherein the gesture includes a manipulation of an orientation of the mobile device.

7. The computer-readable medium of claim 4, wherein the gesture includes an impact between the mobile device and an object.

8. The computer-readable medium of claim 1, wherein the instructions include instructions to:
   deny access to the area responsive to a determination that the user is not allowed access; and
   provide a notification via the mobile device responsive to the denial, wherein the notification includes a reason for the denial.

9. A system for providing access control via a mobile device, comprising:
   an access control system configured to:
      determine an area of a facility to which a user is authorized access; and
      provide a digital identity configured to allow the user access to the area;
   a mobile device configured to:
      receive the digital identity;
      determine that the mobile device is within a particular distance of the area;
      determine a gesture made by the user; and
      determine whether the user of the mobile device is allowed access to the area based on the digital identity; and
   a relay configured to grant the user access to the area of the facility, subsequent to the mobile device determining the gesture, responsive to:
      the determination that the mobile device is within the particular distance of the area; and
      the determination by the mobile device that the user is allowed access to the area.

10. The system of claim 9, wherein the access control system is remote with respect to the facility.

11. The system of claim 9, wherein the access control system is local with respect to the facility.

12. The system of claim 9, wherein the system includes a beacon configured to determine that the user is in within the particular distance of the area.

13. The system of claim 12, wherein the beacon is Bluetooth low energy beacon.

14. The system of claim 9, wherein the mobile device is configured to prompt the user to make the gesture.

15. The system of claim 9, wherein the relay does not include a controller.

16. A method for providing access control via a mobile device, comprising:
   receiving an indication that a mobile device is within a particular distance of an area of a facility;
   receiving an indication that a user performed a gesture using the mobile device, wherein a performance of the input is determined using the mobile device;
   determining whether a user of the mobile device is allowed access to the area; and
   causing a relay associated with the area to allow the user access to the area responsive to a determination that the user is allowed access.

17. The method of claim 16, wherein determining whether the user of the mobile device is allowed access includes determining whether the user is allowed access at a time that the mobile device is within the particular distance of the area.

18. The method of claim 16, wherein the gesture includes a plurality of knocks by the user on the mobile device.

19. The method of claim 16, wherein the gesture includes a presentation of the mobile device to an object associated with the area.

20. The method of claim 16, wherein the gesture includes a particular manipulation of the mobile device, and wherein the particular manipulation does not include the mobile device impacting an object.

* * * * *